Patented May 13, 1952

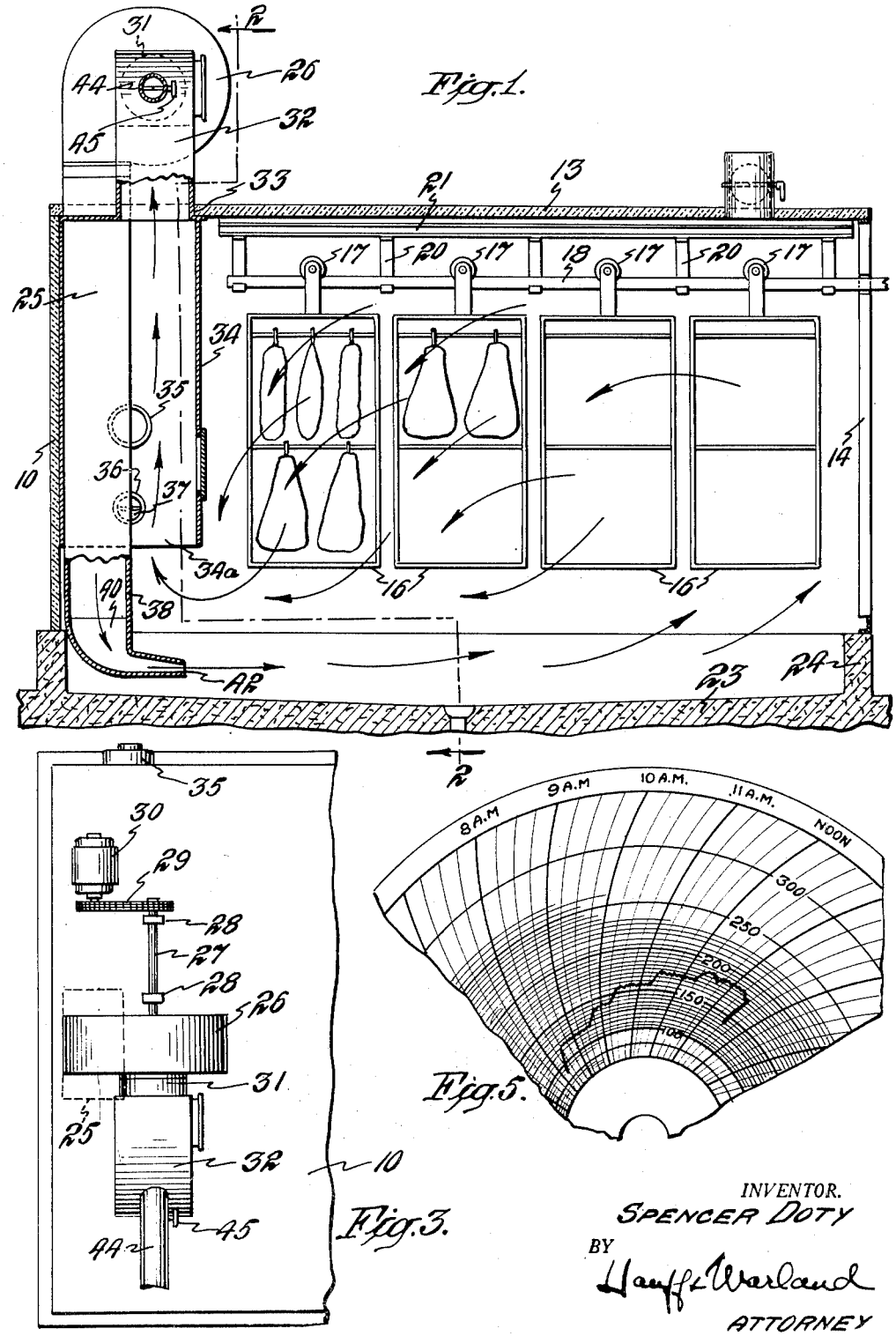

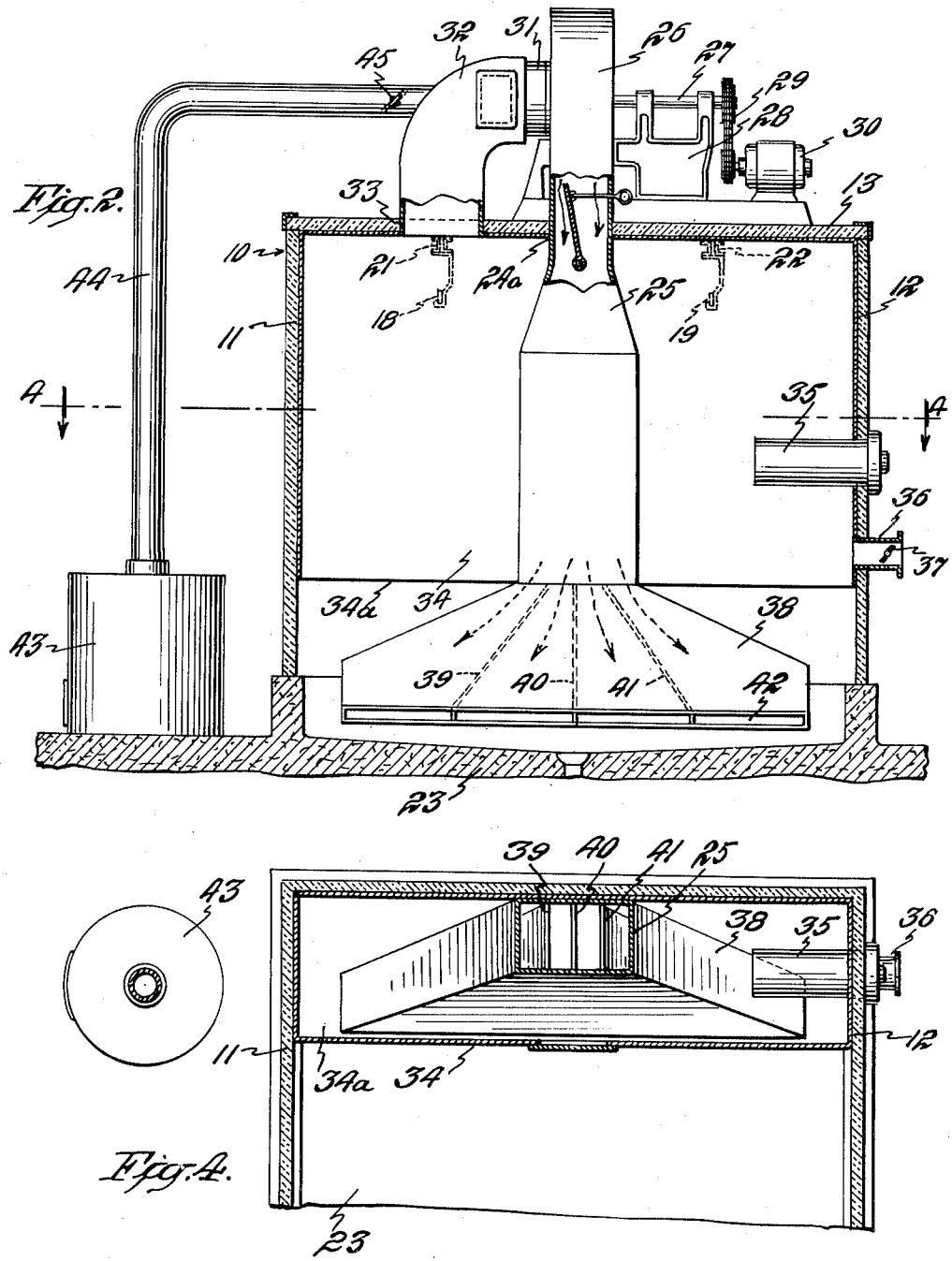

2,596,381

UNITED STATES PATENT OFFICE 2,596,381

METHOD AND APPARATUS FOR CURING MEAT PRODUCTS

Spencer Doty, Floral Park, N. Y., assignor to Charles A. Gehnrich and Herman G. Gehnrich, doing business as Woodside Smokehouse Company, Woodside, N. Y.

Application February 19, 1949, Serial No. 77,318

4 Claims. (Cl. 99—229)

This invention relates to a method and apparatus for the treatment of articles, especially food products as a group to insure the even impregnation and treatment of the individual members of the group.

Various meat products such as hams, salami, bologna and the like are commonly heat treated or cured to prepare and properly condition the meat for market. This heat treatment is often applied in conjunction with smoke which improves the aroma and flavor characteristics and apparently has other desirable curing effects on the meat products.

The curing of meat products is often carried out in a smokehouse wherein the meat is subjected to a series of conditioning treatments intended to cure and condition the meat products uniformly. The ordinary form of smokehouse comprises an elongated enclosure through which is first circulated dry hot air for drying the surface of the meat and stimulating the chemical action of the curing agents with which the meats may be impregnated. The meats are usually introduced into the smokehouse on suitable racks or trees situated in parallel within the structure and mounted on suitable tracks to facilitate the loading and unloading of the smokehouse. After a relatively short period the initial drying and curing heat treatment is completed and the meat products within the house may be subjected to the action of a circulating stream of heat and smoke during further treatment of the meat. The temperature within the enclosure is initially raised and held at this temperature for a short period of time to allow the meat to reach the desired temperature. Thereafter the temperature is raised to a somewhat higher level until the meat has again had the opportunity to be thoroughly impregnated with the heat and achieve the new temperature. This process is continued in a stepwise manner in order to avoid overheating the surface and to effect a more or less uniform distribution of heat within the meat.

Material difficulties have been encountered in the treatment of meat and other heat sensitive products by conventional means since the convection currents of gases do not result in a uniform impregnation and treatment of the articles disposed within the enclosure with a result that it is necessary to continuously switch the articles around to different positions in the attempt to secure uniformity of treatment. Furthermore, in the conventional meat curing process some of the trees are found to be overheated resulting in excessive shrinkage while other trees located at opposite positions in the oven are starved or undertreated and must be returned to the oven and given an additional period of treatment. Also in the Government inspection of meat products it is common for the inspector to individually test each ham or other meat product after the curing process to see that it has reached the minimum temperature requirements for the curing process. In conventional methods, the individual meat products are often below the minimum temperature requirements and consequently must be further treated, either individually or batchwise, with the result that often the products are overtreated and shrink resulting in substantial losses.

The difficulties occasioned by these phenomena have effected the efficiency of such methods and heretofore it has been difficult or impossible to uniformly heat and impregnate a group of meat products in a batchwise manner. This is especially true in the case of pork products where a predetermined temperature is required to destroy trichina and other disease producing organisms.

It is a primary object of the present invention to provide a method and apparatus to accomplish the uniform circulation of heat within an enclosure to uniformly treat a group of articles contained therein.

A further object of the invention is to provide within a smokehouse means for effecting the substantially uniform circulation and convection of heat and smoke to accomplish an even impregnation and treatment of the meat products contained within the smokehouse.

An additional object of the invention is to provide a smokehouse wherein means are provided for the equal distribution of heat throughout the house so that the temperature of the meat at each successive heating stage approaches the observed temperature of the gases.

Another object of the invention is to provide a method for overcoming the difficulties encountered in prior practice by uniformly treating a group of meat products to thereby eliminate the necessity for retreating certain of the specimens to complete the curing process.

Other objects and advantages will be apparent to those skilled in the art from the following detailed description of what is now considered the preferred embodiment of the invention.

The invention, accordingly, comprises the features of construction, combination of elements, arrangement of parts and methods of operation which will be exemplified in the embodiment hereinafter set forth and the scope of the invention will be indicated in the claims.

The invention in general comprises a method of treating and curing meat and other food products which comprises discharging a heated gas under pressure along one side of a group of the products while suspended in a smokehouse or other elongated enclosure in spaced relation, directing the gas around the end of the products and then back in a direction opposite to the direction of discharge and through and around the meat products while suspended in the house and finally withdrawing said heated gas at approximately the point at which the heated gas was discharged into the house. During the described treatment the temperature of the gas is progressively increased to gradually raise the internal temperature of the meat and avoid over-curing the outer surface thereof. The invention also contemplates a preferred form of apparatus for use in conjunction with the method in carrying out the objectives of the invention in a preferred manner.

Although the invention is described with particular reference to the treatment of meat and other curable food products, it is understood that the apparatus could be used in the heating and drying of sundry articles and products.

A suitable apparatus is shown in the accompanying drawings wherein Fig. 1 shows a longitudinal section of a smokehouse incorporating the principles of the invention.

Fig. 2 is a transverse section of the same house on the line 2—2 of Fig. 1;

Fig. 3 is a partial view showing the motor operated blower used in connection with the apparatus;

Fig. 4 is a partial horizontal section on the line 4—4 of Fig. 2 showing the details of the discharge manifold for the heated gaseous products being introduced into the smokehouse; and Fig. 5 is a graphic representation of a time and temperature curve illustrating the conditions maintained during a typical operation.

Referring to the drawings and Figs. 1 and 2 in particular, the illustrated form of apparatus comprises an end wall 10, side walls 11 and 12, a roof 13 and a door 14 at the opposite end of the enclosure from the end wall 10. The meat products to be treated are disposed in spaced relationship on a plurality of racks or trees 16 which are in turn movably supported by rollers 17 on parallel tracks 18 and 19 of which two are shown in the present instance in Fig. 2. The tracks 18 and 19 are suspended by hangers 20 from beams 21 and 22 which are suitably secured to the roof 13. It will be appreciated that any number of these tracks 18 and 19 may be mounted in parallel across the width of the enclosure in a manner such that successive batches of the products may be conveniently loaded and unloaded through the door 14 for treatment.

As shown, the smokehouse in its entirety is mounted on a concrete base 23 formed with a rectangular supporting ledge 24 upon which rest the end wall 10 and side walls 11 and 12. The roof 13 has an opening 24a at one end, as shown in Fig. 2, for a duct 25 connecting with the outlet of a blower 26 mounted on top of the enclosure. The drive shaft 27 of blower 26 is supported in a bearing bracket 28 and is driven through a belt 29 by a motor 30. The inlet 31 of the blower 26 is fed through the inlet duct 32 which communicates through an opening 33 in the roof 13 with the end of the smokehouse. This end of the house is closed off by a metal partition 34 extending entirely across the width of the smokehouse and downwardly therein to a point substantially below the meat racks 16 for a purpose to be presently described.

Heated gases, after circulating through the oven and treating the meat products contained therein, pass below the partition 34 formed across the end of the smokehouse as shown in Fig. 1 of the drawing. The heated gases pass upwardly in the passage 34a formed by the partition 34 and leave the house through the duct 32 and enter the inlet 31 of the blower 26. An electric heater or gas burner 35 is mounted in the outlet passage 34a formed by the partition 34 so as to heat the gases as they emerge from the lower portion of the house and before they enter the blower 26. Also mounted in the outlet passage 34a is an air inlet 36 having a damper 37 for the admission of fresh air into the smokehouse during the drying off period.

The heated gases are drawn through the blower inlet 31 and forced back into the house through the duct 25, the end of which terminates in a fan-shaped manifold outlet 38, as shown in Fig. 2. This manifold 38 is provided with a number of partitions 39, 40 and 41 which direct the heated gases through a relatively narrow outlet 42 located in the illustrated embodiment adjacent the bottom of the smokehouse.

The heated gases are ejected through this outlet 42 under sufficient pressure so as to travel along the length of the smokehouse in a direction below the meat products being treated on the racks 16. When the heated gases reach the other end of the smokehouse they are given a swirling motion upwardly and are directed back in the opposite direction in the upper portion of the house and around and through the meat products suspended on the racks 16. The gases then pass downwardly and are withdrawn through passage 34a. By withdrawing the gases near the point of discharge, a very complete and thorough convection and circulation is accomplished with the result that the temperature of the meat products contained within the smokehouse is uniformly raised and the products are thoroughly and evenly impregnated with smoke and heat. The gases are given a circular movement within the house so as to circulate entirely around and through the suspended meat products with the result that all specimens are uniformly treated.

The enclosure may be provided with smoke through the combustion of sawdust or other suitable fuels which are burned in a stove 43 which communicates with the blower inlet duct 32 through a conduit 44 provided with a damper 45.

Referring to Fig. 5, the temperature conditions existing within a smokehouse are shown during the treatment of a batch of salami. In treating this batch of salami, heated air at a temperature of about 120° F. is introduced into the smokehouse through the manifold 38 at a relatively high velocity. After discharge through the elongated slot 42 of the manifold 38, the heated gas passes along the lower portion of the house, as indicated by the arrows, and then on striking the end of the house circulates upward and in a reverse direction along the upper portion of the smokehouse and through and around the salami specimens suspended on the racks 16. The portion of the gas traveling along the upper portion of the smokehouse then passes downwardly as indicated in general by the arrows and finally is withdrawn from the house adjacent the point of discharge through the vertical passage 34a formed by the partition wall 34. The gas during withdrawal through this passage is warmed by the heater 35, passes through the duct 32 and the inlet 31 of the blower 26 wherein it is given an increased velocity and again discharged into the house through the manifold 38 and the relatively narrow outlet 42. This continuous circulation of the heated gas is continued for a period of about an hour as indicated in the graph after the salami is uniformly impregnated to acquire the heat of the gas. The temperature is then elevated to about 140° F. and held at this level for a period of about one-half hour after the meat has acquired approximately the temperature of the gases. The temperature is then again elevated to about 155° F. and the meat held at this temperature for a period of about 45 minutes, thereafter being again raised to a temperature of 170° F. and held for a period of about 45 minutes. The temperature of the house is finally increased to about 185° F. and held at that temperature for about an hour and fifteen minutes.

In the particular process described, smoke from the stove 43 passes up the flue 44 and is intermingled with the hot gas entering the blower 26 through the duct 32 in amounts controlled by the damper 45. The introduction of smoke into the process is started near the end of the initial heating stage in the particular example described.

At the termination of the process the batch is removed through the door 14 and the individual specimens of salami tested by means of a thermometer. It was found that in all cases the salami specimens had reached the maximum temperature of the process and when further tested it was found that the specimens were uniformly treated with heat and smoke rendering further treatment of the products unnecessary. Furthermore, it was observed that in no instance had excessive shrinkage of the meat products occurred.

It is observed that the smokehouse or other enclosure is so constructed and the products arranged within the enclosure in such a manner that substantially the bulk of the gases are directed through and around the suspended products being treated. In certain cases perforated baffles or other deflecting means suspended from the roof may be advantageous particularly where an air space is created in the upper portion of the enclosure by the disposition of the products a substantial distance below the roof on the racks. These and other changes and modifications are contemplated without departing from the spirit of the invention.

It will be appreciated that I have devised a novel method and apparatus whereby uniform curing and smoking of meat products may be accomplished with greatly increased efficiency and a substantial improvement in the quality of the meat products produced.

A remarkable feature of my process is that, for example in the case of tenderized hams, the time required for fully curing the hams weighing from 15 to 30 lbs. each was 11 hours as compared to a time period of from 18 to 20 hours in the conventional form of smokehouse. In practically all cases the color of the meat products is substantially improved and the degree of shrinkage materially reduced as compared with that commonly encountered in existing methods. Accordingly, an outstanding advantage achieved through use of the present method and apparatus is that a given quantity of meat may be fully treated and smoked in a little over half the time required in the ordinary form of smokehouse resulting in more efficient use of floor space in the plant and resulting economies in the investment for each pound of meat cured. Also the production technique is considerably improved due to the fact that the various trees need not be switched around from one place to the other and none have to be replaced in the smokehouse for additional heating.

Although the illustrated embodiment of the invention shows the gases being discharged and withdrawn at the lower portion of the enclosure, it is to be understood that the gases may be discharged at other locations and circulated about the products in a similar manner without departing from the spirit and scope of the invention.

The invention is particularly applicable to the preparation of smoked meat products but it is understood that it may be advantageously used in the treatment of fish, poultry, and other products that are usually processed with heat and/or smoke.

I claim:

1. A method of treating meat products which comprises discharging a gaseous heating medium at relatively high velocity below into contact with and near one end of a group of the meat products disposed in spaced relation to one another in an elongated treating zone, said gaseous heating medium being discharged under sufficient pressure to travel the length of the heating zone below the group of meat products, directing the gaseous heating medium around the opposite end of the food products and in the reverse direction through said treating zone in a swirling motion so that the heating medium circulates uniformly between and around the said food products, progressively increasing the temperature of the heating medium introduced into the treating zone and finally withdrawing the heating medium near the lower portion of the treating zone adjacent the point at which the gaseous heating medium was discharged into said treating zone.

2. An apparatus for heat treating products comprising an enlarged treating zone including an elongated enclosure having a top, bottom, side and end walls, means for suspending a group of products to be heat treated in spaced relation within the said treating zone and in spaced relation to the top and bottom thereof, means disposed near the bottom and located at one end of the treating zone for discharging a gaseous heating medium at relatively high velocity along the bottom of the treating zone and below the group of products being treated, said gaseous discharge means extending substantially across said treating zone between the side walls thereof, a blower for directing the gaseous heating medium to the discharge means under sufficient pressure to travel the entire length of the enclosure below the group of products being treated and a conduit connecting the blower with the discharge means, whereby the gaseous heating medium from the discharge means is directed upwardly at the opposite end of the enclosure and in the reverse direction in a swirling motion between and around the products to be treated, and an outlet for the gaseous heating medium disposed near the bottom and at the same end of the treating zone as the gaseous discharge means for removing the gaseous heating medium from the enclosure.

3. An apparatus for heat treating products comprising an enlarged treating zone including an elongated enclosure having top, bottom, side and end walls, means for suspending a group of products to be treated in spaced relation to the said walls of the enclosure, an elongated discharge nozzle located at one end and near the bottom of the enclosure and directed for the discharge of a gaseous heating medium at relatively high velocity below the group of products and toward the opposite end of the enclosure, said elongated discharge nozzle extending substantially across said treating zone, means for delivering the gaseous heating medium to said discharge nozzle under sufficient pressure to travel to the opposite end of the enclosure below the group of products being treated, and a conduit connecting said means with the discharge nozzle, whereby the gaseous heating medium from the discharge nozzle is directed upwardly at the opposite end of the enclosure and in the reverse direction in a swirling motion between and around the products being treated, and an elongated outlet for the gaseous heating medium extending cross-wise of the enclosure and disposed at the lower portion of the treating zone just above the elongated discharge nozzle at the same end of the enclosure for removing the gaseous heating medium from the treating zone.

4. An apparatus for heat treating products comprising an enlarged treating zone including an enclosure having top, bottom, side and end walls, means for suspending a group of products to be treated within the said treating zone and in spaced relation to the walls thereof, a substantially continuous elongated discharge nozzle near the lower portion of the treating zone at one end of the enclosure and positioned for directing a gaseous heating medium at relatively high velocity toward the opposite end of the enclosure below the group of products, said discharge nozzle extending substantially across said heating zone, a blower for directing the gaseous heating medium to the elongated discharge nozzle under sufficient pressure to travel to the opposite end of the enclosure below the group of products being treated, a conduit connecting the blower with the discharge nozzle, and a heater for controlling and progressively raising the temperature of the gaseous heating medium delivered to the elongated discharge nozzle, whereby the gaseous heating medium from the elongated discharge nozzle is directed below the group of products, upwardly at the opposite end of the enclosure and in the reverse direction in a swirling motion between and around the products to be treated, an outlet extending across and near the bottom of the treating zone and above the elongated discharge nozzle for removing the gaseous heating medium from the enclosure, and means for recirculating gases passing through said outlet to the blower for redelivery to the elongated discharge nozzle.

SPENCER DOTY.

REFERENCES CITED

The following references are of record in the file of this patent:

UNITED STATES PATENTS

| Number | Name | Date |
| --- | --- | --- |
| 1,010,327 | Trescott | Nov. 28, 1911 |
| 2,074,945 | Skvor | Mar. 23, 1937 |
| 2,078,639 | Rohrmann | Apr. 27, 1937 |
| 2,310,222 | Deverall | Feb. 9, 1943 |
| 2,312,339 | Jones | Mar. 2, 1943 |
| 2,352,590 | Trinkle | June 27, 1944 |
| 2,380,428 | Gilliam | July 31, 1945 |